United States Patent [19]  [11] 4,337,479
Tomimoto et al.  [45] Jun. 29, 1982

[54] COLOR RESOLUTION COMPENSATOR

[75] Inventors: Tetsuo Tomimoto, Osaka; Yoshio Yasumoto, Higashiosaka; Eiichi Taira, Hirakata, all of Japan

[73] Assignee: Matsushita Electric Industrial Co., Ltd., Osaka, Japan

[21] Appl. No.: 184,329

[22] Filed: Sep. 5, 1980

[30] Foreign Application Priority Data

Sep. 13, 1979 [JP] Japan .................... 54-118522
Sep. 14, 1979 [JP] Japan .................... 54-118476
Dec. 6, 1979 [JP] Japan .................... 54-158546

[51] Int. Cl.$^3$ ............................. H04N 9/535
[52] U.S. Cl. .................................... 358/37
[58] Field of Search ................ 358/37, 39, 40

[56] References Cited

U.S. PATENT DOCUMENTS 4,245,239  1/1981  Richman .......................... 358/37

Primary Examiner—Robert L. Richardson
Attorney, Agent, or Firm—Wenderoth, Lind & Ponack

[57] ABSTRACT

A color resolution compensator for a color television receiver improves the resolution of a reproduced color picture by mixing a high frequency component of a luminance signal to a color difference signal to generate a signal to be fed to the color demodulators of the television receiver. Various portions of the luminance signal and the color difference signal may be optimally selected in dependence upon various predetermined design parameters.

12 Claims, 21 Drawing Figures

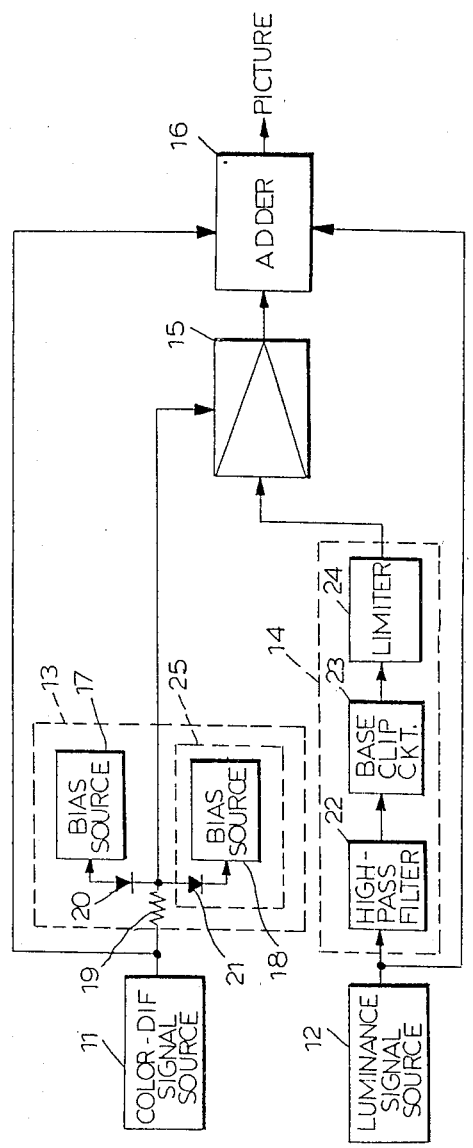

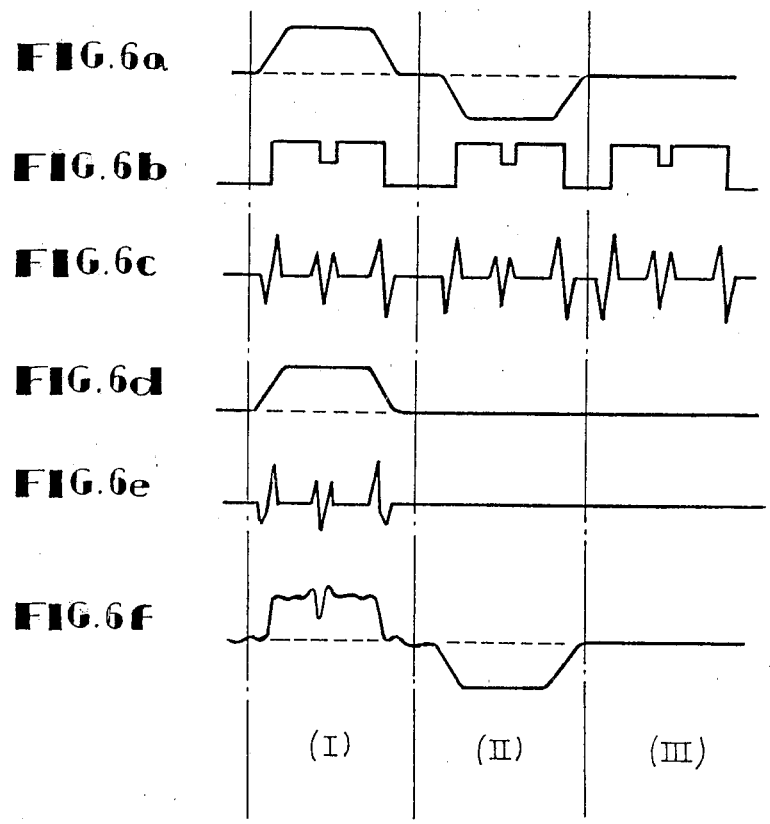

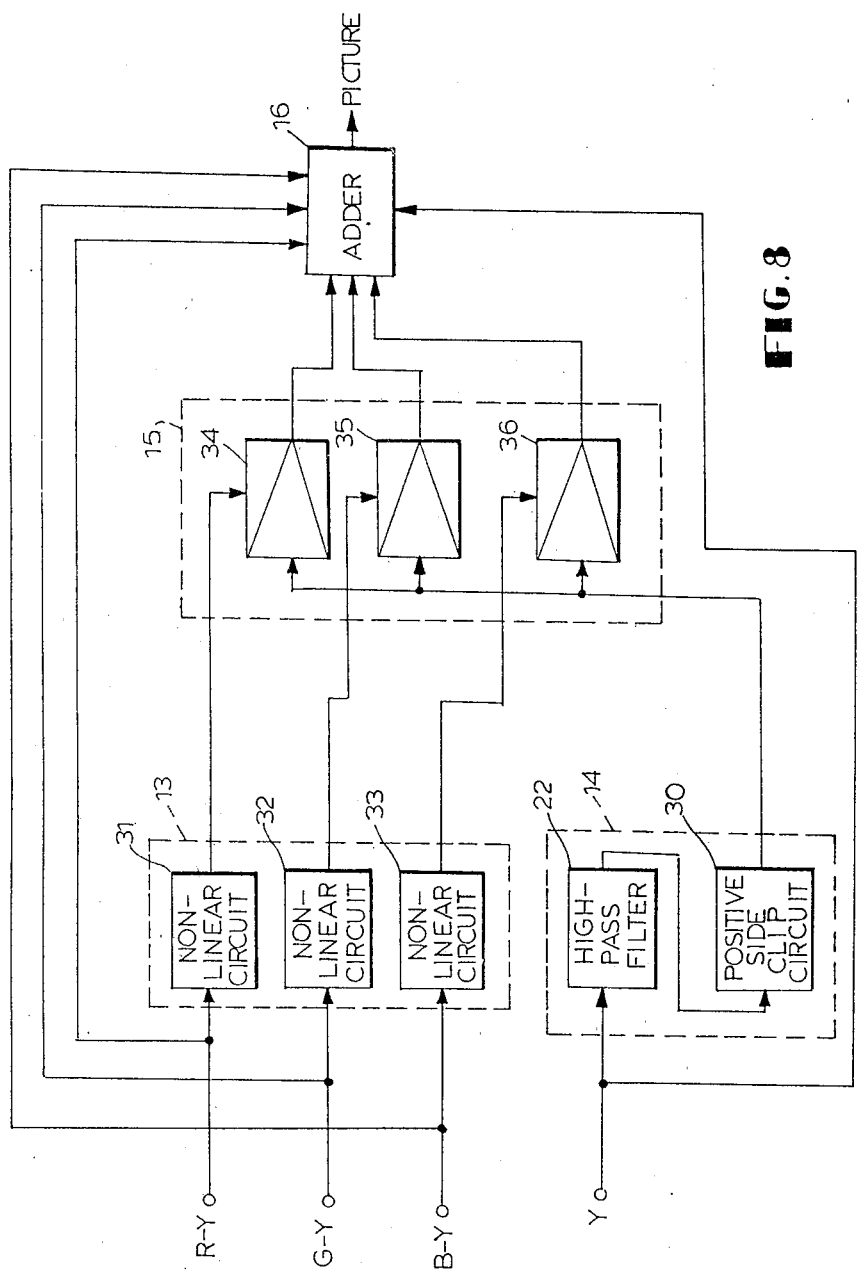

COLOR RESOLUTION COMPENSATOR

BACKGROUND OF THE INVENTION

This invention relates to a color resolution compensator of a colored picture at a color television receiver, and more particularly to a color resolution compensator capable of reproducing a fine picture of a colored portion.

FIG. 1 is a block diagram of a part of a conventional color television receiver, in which an intermediate frequency signal is detected by a video detector 1 and given to a luminance signal amplifier 2 and a band pass amplifier 3. The band pass amplifier 3 picks up a carrier chrominance signal included in the composite color picture signal and supplies it to three color demodulators 4, 5 and 6.

The above-noted color demodulators 4, 5 and 6 demodulate the carrier chrominance signal to obtain three kinds of color-difference signals (R-Y, G-Y and B-Y) and supply them to three adders 7, 8 and 9.

The adders 7, 8 and 9 add the color-difference signal supplied to each adder with a luminance signal transferred from the luminance signal amplifier 2 to thereby produce three kinds of color primary signals and supply them to a picture tube 10.

The aforenoted conventional color television receiver generates a color-difference signal (e.g. an output of color demodulator 4) with a considerably narrower band width than that of the luminance signal transferred from luminance signal amplifier 2. For example, a NTSC system color television receiver has a frequency range of 0 Hz to 3 MHz for a luminance signal, while for a color difference signal has a narrow frequency range of no more than 500 KHz. Hence, in the colored picture, color-difference signals with a narrow bandwidth mainly constitute the picture, which is of poor sharpness and is dim.

SUMMARY OF THE INVENTION

This invention has been designed to overcome the aforesaid problems, and aims at a remarkable improvement in the resolution of colored picture portions by mixing the high frequency component of the luminance signal with the color-difference signal when said signal is over a specified level.

BRIEF DESCRIPTION OF THE DRAWINGS

Next, this invention will be detailed in the following description with the aid of the accompanying drawings, in which:

FIG. 3 is a block diagram of a more detailed embodiment of the invention;

FIGS. 5a-5d and 6a-6f show waveforms exemplary of signal disposal of the invention; and FIGS. 7 and 8 are block diagrams of modified embodiments of the invention.

DESCRIPTION OF PREFERRED EMBODIMENTS

Figure 1:
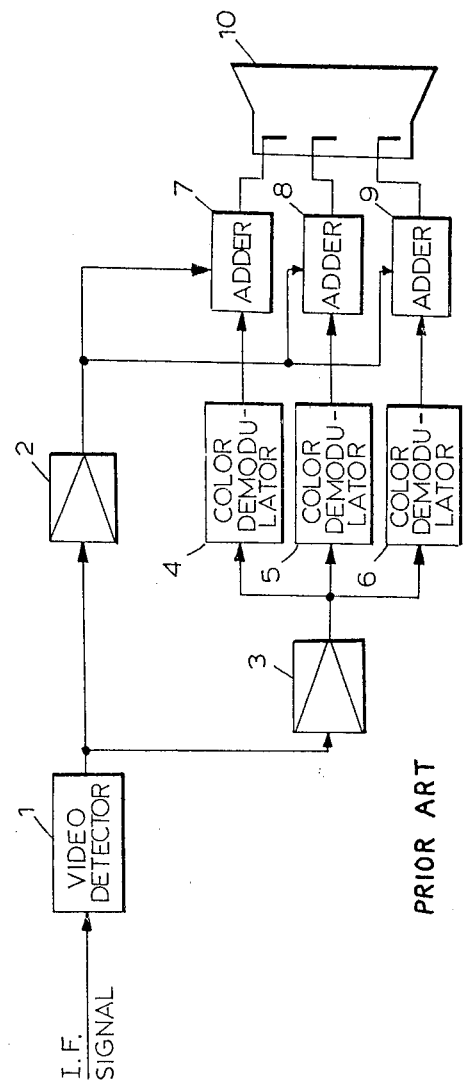
FIG. 1 is a block diagram of a conventional embodiment.
Figure 2:
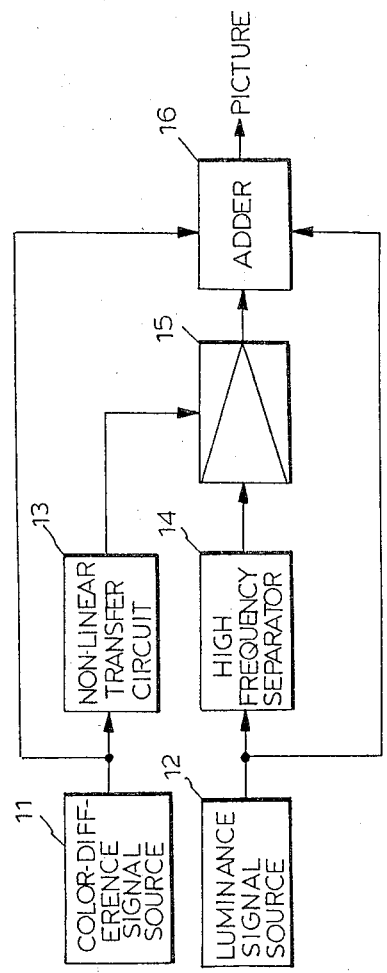
FIG. 2 is a block diagram of an embodiment of the present invention.
Figure 4A:
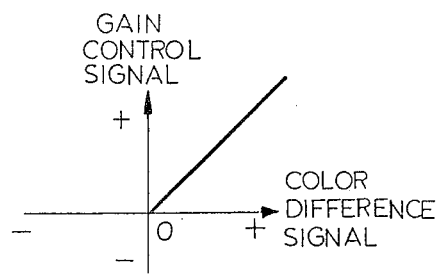
FIGS. 4a-4f are views showing the characteristics of a non-linear transfer circuit used in the invention.
Figure 4B:
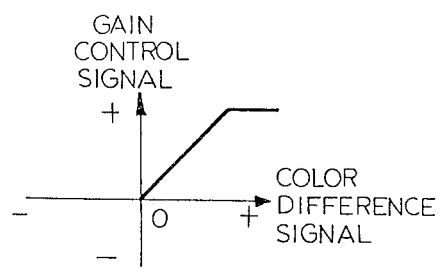
Figure 4C:
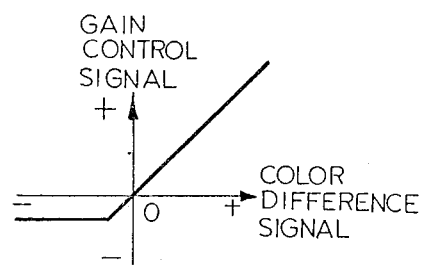
Figure 4D:
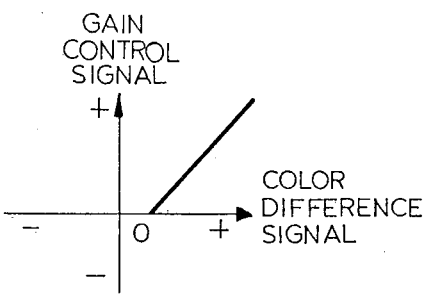
Figure 4E:
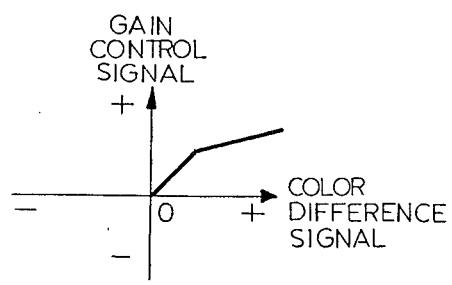
Figure 4F:
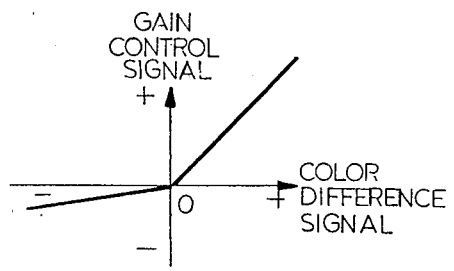

FIG. 2 is a block diagram of an embodiment of the invention, in which a color-difference signal source 11 generates a color-difference signal, and any one of the color demodulators in FIG. 1 may be used as the signal source 11. A luminance signal source 12 generates a luminance signal, and which may be the luminance signal amplifier 2 in FIG. 1. A non-linear transfer circuit 13 has a non-linear transfer characteristic for transferring the color-difference signal supplied from the color-difference signal source 11 and outputs the transferred color-difference signal as a gain control signal. A high frequency separator 14 separates and outputs a high frequency component of the luminance signal supplied from the luminance signal source 12. A variable gain amplifier 15 is connected with the high frequency separator 14 and non-linear transfer circuit 13 and controls the gain with respect to the high frequency component of the luminance signal by means of a gain control signal output from the non-linear transfer circuit 13. The high frequency component which is controlled by the gain is provided as a compensating signal to an adder 16, in which the compensating signal is added with the color-difference signal and the luminance signal for reproducing a colored picture.

The transfer characteristic of the non-linear transfer circuit 13 is defined only by the fact that a suitable compensating signal should be output from the variable gain amplifier 15 when the compensating signal is required, but not defined by other matters.

The high frequency separator 14 is sufficient to substantially remove the high pass component of the luminance signal, but is not limited to a mere high pass filter.

The adder 16 is a summing device in a broad sense of reproducing a picture, which is not limited to a mere electronic circuit, but includes, for example, composition at a CRT (cathode ray tube) electric gun or luminous stage the CRT surface. In the embodiment of the invention, the lower the resolution of colored picture becomes by overlapping the color-difference signal having a narrow bandwidth with the luminance signal having a large bandwidth, the larger the compensating signal transferred to the adder 16 becomes, thereby improving the resolution.

FIG. 3 is a block diagram of a more detailed embodiment of the invention, in which blocks identical with those in FIG. 2 are represented by the same reference numerals. In FIG. 3, a non-linear transfer circuit 13 includes bias sources 17 and 18, diodes 20 and 21, and resistance 19. These function to produce the gain control signal from the color-difference signal for controlling the intensity of the compensating signal.

In other words, a color-difference signal reducer 25 comprises the bias source 18 and diode 21 and functions to reduce a component of the color-difference signal over a specified level and fed from the color-difference signal source 11. Simultaneously, a circuit comprising the bias source 17 and diode 20 functions to reduce a component of the color-difference signal under a specified level. Hence, the DC bias voltages from the bias sources 17, 18 and output impedance permit the non-linear transfer circuit 13 to have various forms of input-output characteristics.

FIGS. 4a-4f are exemplary of the above-noted input-output characteristics. FIGS. 4a-4f are shown under the following premises for the convenience of expression, but this invention is not limited to such premises.

(1) The axis of the abscissa shows the color-difference signal input level. In these figures, the polarity and zero level of the color difference signal mean the polarity and zero level of the picture information, which are not always coincident with voltage in the circuit.

(2) The axis of the ordinate shows the gain control signal. The variable gain amplifier 15 keeps a positive gain when a positive gain control signal is provided thereto and increases the gain monotonically following an increase of the gain control signal, and also makes the gain substantially zero when the gain control signal is of a zero level.

The input-output characteristics shown in FIGS. 4a through 4f will be described with respect to the features of their effects as follows:

(a) A compensating signal is not generated when the color-difference signal is negative, and is generated correspondingly to the intensity thereof when positive. In other words, when the positive color-difference signal shades the luminance signal on a picture, the compensating signal is generated to restore the lost fine portions on the picture.

(b) A compensating signal is generated only when the color-difference signal is positive, similarly to the case of (a), but the gain control signal is limited to a certain level for a large color-difference signal over a specified level, to inhibit over compensation.

(c) When the color-difference signal is positive, the same function as (a) is carried out, but, when negative, a small compensating signal with reverse polarity is generated. Usually, this invention is effective to be applied to a plurality of color-difference signals, and the characteristic in the case (c) has an effect to remedy undesirable colaration generated by a compensating signal of other color-difference signals.

(d) A compensating signal is generated when the color-difference signal has a value over a positive specified level, in which the effect can be limited only in saturated color picture portions.

(e) The purpose for effects is the same as the case (b), but an increase of the amount of compensation gradually declines with respect to an increase of the positive color-difference signal.

(f) The purpose for effects is the same as the case (c), but the compensating signal at the negative side is allowed to increase little by little.

In addition, characteristics in (a) to (f) all show a zero gain control signal with respect to a color-difference signal of a zero level, which is intended to be free from useless coloration on a black and white picture.

The non-linear transfer circuit in FIG. 3 has been exemplified in various ways of its input-output characteristics, but this invention is not limited in these examples, but includes all the non-linear transfer circuits adapted to generate a gain control signal for generating compensating signal sufficient for an intensive color-difference signal.

In the embodiment in FIG. 3, a high frequency separator 14 comprises a high pass filter 22, base clip circuit 23, and limiter 24. A luminance signal output from the luminance signal source 12 is fed to the high pass filter 22, wherein a high frequency component of the luminance signal is separated. The high frequency component is provided to the base clip circuit 23, wherein the signal within a specified range including the zero level is removed. This function removes noise from the high frequency component. The high frequency component which is free from noise is supplied to the limiter 24, wherein signals of excessive amplitude are limited, and thereafter transferred to the variable gain amplifier 15.

Figure 5A:
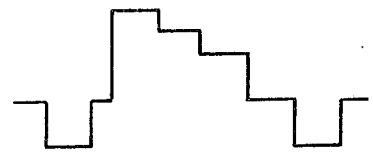
Figure 5B:
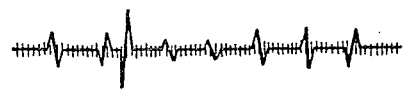
Figure 5C:
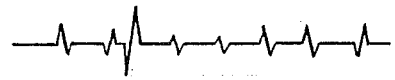
Figure 5D:
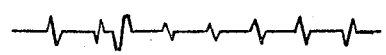

The above-noted high frequency separator 14 is exemplified, in FIGS. 5a–5d, of a waveform at each unit. FIG. 5a illustrates a luminance signal input; FIG. 5b illustrates an output of the high pass filter 22; FIG. 5c illustrates an output of base clip circuit 23 and FIG. 5d illustrates an output of limiter 24. In addition, the base clip circuit 23 and limiter 24 are used for effectively practicing this invention, the high frequency separator, if constructed only of the high pass filter, is sufficiently effective.

The variable gain amplifier 15 in FIG. 3 amplifies the output signal of high frequency separator 14, but is controlled with respect to its gain by the aforesaid control signal.

FIGS. 6a–6f are waveform diagrams explanatory of the effect of this invention, in which a waveform at each unit is shown in the three cases I, II, and III in relation to the luminance signal and the color-difference signal. The characteristic of non-linear transfer circuit 13 is assumed as in FIG. 4a.

FIG. 6a illustrates a color-difference signal input, which is of a positive polarity in I, of a negative polarity in II, and is zero in III. A luminance signal input is shown in FIG. 6b, in which the waveform is uniform in I, II and III. FIG. 6c shows a high frequency component of the luminance signal, in which the waveform is uniform in I, II, and III. FIG. 6d shows an output waveform of the non-linear transfer circuit 13, in which the positive component of the color-difference signal shown in FIG. 6a is output. FIG. 6e illustrates an output waveform, i.e., compensating signal, from variable gain amplifier 15. The compensating signal is obtained by controlling the amplified gain in accordance with the waveform of FIG. 6d with respect to the waveform of FIG. 6c, and is found only during the period of I, in which the color-difference signal presents a positive polarity. The compensating signal of FIG. 6e is added to the color-difference signal of FIG. 6a to create the signal as shown in FIG. 6f. The signal shown in FIG. 6f, when compared with the original color-difference signal of FIG. 6a shows its improved resolution from the positive component of the color-difference signal. The reason for such compensation to be carried out mainly at the positive side of the color-difference signal is as follows: Generally, color scientific luminance at colored picture portions is transferred from not only the luminance channel but also the color-difference signal channel. Especially, as to highly saturated colors, the luminance component transferred from the color-difference signal channel is much larger than that from the luminance channel. Furthermore, the luminance component transferred from the color-difference signal channel is almost transferred from the positive color-difference signal channel which decreases the resolution of a picture.

Hence, the compensating signal, when added to the positive color-difference signal, generates by itself the color scientific luminance on the picture, thereby remarkably improving the resolution of picture. If the color-difference signal, without using the non-linear transfer circuit 13, is supplied to variable gain amplifier 15 directly as the gain control signal, the compensating signals added to a plurality of color-difference signals, each generate the luminance component on the picture, resulting in that each luminance component is mutually negatived, thereby remarkably lowering the effect on most pictures. Hence, the non-linear transfer circuit 13 of the present invention has an essential and important meaning.

Figure 7:
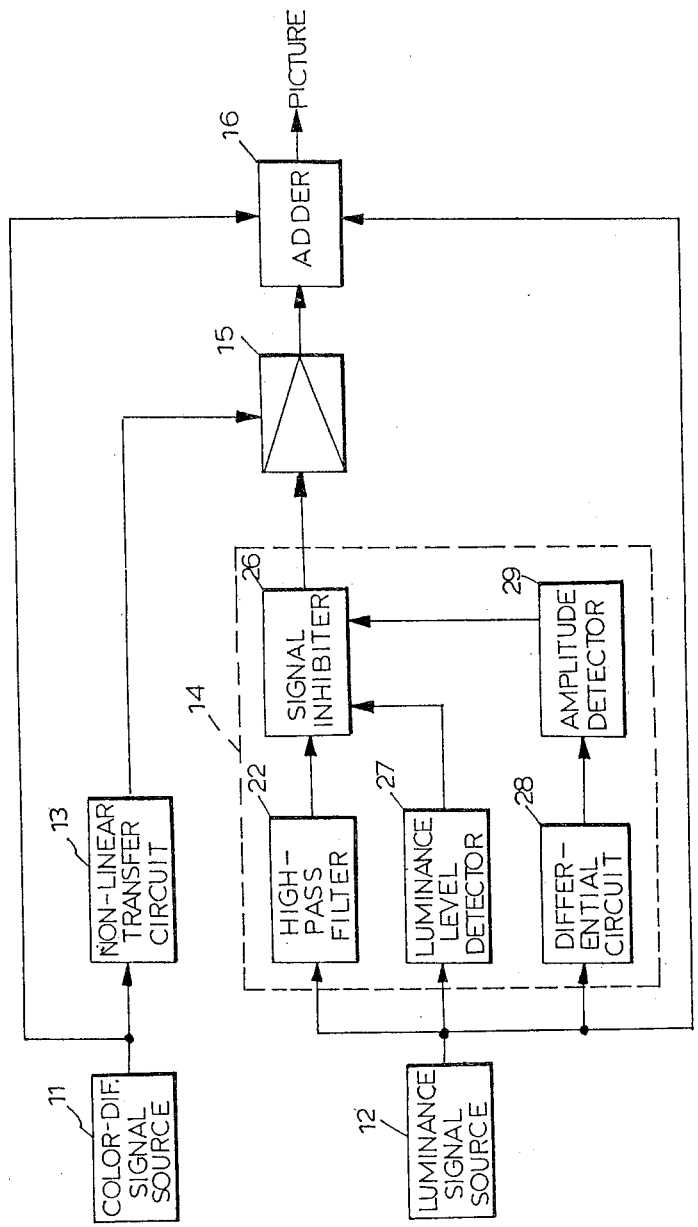

FIG. 7 is a block diagram of a modified embodiment of the invention, in which the blocks identical with those in FIGS. 2 and 3 are represented by the same reference numerals. In FIG. 7, a high frequency separator 14 comprises a high pass filter 22, signal inhibiter 26, luminance level detector 27, differential circuit 28 and amplitude detector 29. The luminance level detector 27 is provided with a luminance signal from a luminance signal source 12 to thereby generate a detected signal when the luminance signal level is over a specified level, the detected signal being provided to signal inhibiter 26. Upon supply of the above-noted detected signal, the signal inhibiter 26 reduces a high frequency component of the luminance signal supplied from the high pass filter 22, thereby preventing the high frequency component from being transferred to the variable gain amplifier 15. This embodiment does not generate a compensating signal for the bright picture portions. Especially, when this embodiment is applied to the R-Y channel, no compensation signal is generated for flesh color, which is a relatively bright color. Televiewers are visually sensitive to flesh color so that a slight coloration or unnaturalness caused by the compensating signal becomes very significant, whereby the embodiment in FIG. 7 is desirably effective.

On the other hand, the luminance signal from the luminance signal source 12 is also provided to the differential circuit 28, at which a variation of the luminance signal is detected, the variation being provided to amplitude detector 29. The detector 29, when the variation is large in amplitude, generates a detection signal and supplies it to the signal inhibiter.

Consequently, when the luminance signal varies too much so as to generate an excessive compensating signal, the detection signal causes signal inhibiter 26 to reduce the high frequency component, thereby not transferring the high frequency component to the variable gain amplifier 15. This construction also inhibits the generation of an undesirable compensating signal to make effective the practical use of the invention.

In addition, the high frequency separator 14 is merely exemplary, so that various constructions for substantially removing the high frequency component of the luminance signal are all applicable for this invention.

FIG. 8 is a block diagram of another modified embodiment of the invention, in which a non-linear transfer circuit 13 includes three non-linear circuits 31, 32 and 33 corresponding to R-Y, G-Y and B-Y signals. The non-linear circuit 31 is given the non-linear transfer characteristic corresponding to FIG. 4d, thereby preventing generation of a compensating signal on the picture for the flesh color. Other non-linear circuit 32 and 33 are given the non-linear transfer characteristic corresponding to FIG. 4b respectively. A high frequency separator 14 includes a positive side clip circuit 30. The positive side clip circuit 30 removes the positive side component from the high frequency component of the luminance signal, whereby the compensating signal output from variable gain amplifier 15 can be made to have a negative component only, thus avoiding unnecessary coloration by compensation of the picture.

As seen from the above, the color resolution compensator of the invention is effective to remarkably improve the resolution of color television picture by use of a simple circuit constitution.

What is claimed is:

1. A color resolution compensator for a color television receiver having a color difference signal source and a luminance signal source, said compensator comprising:
a non-linear transfer means, connected to said color difference source, for generating a gain control signal, said gain control signal bearing a monotonic non-linear relationship to a color difference signal generated by said color difference source;
a high frequency separator means, connected to said luminance signal source, for generating an output corresponding to a high frequency component of a luminance signal generated by said luminance signal source;
a controlled variable gain amplifier means, connected to said non-linear transfer means and said high frequency separator means, for generating a compensating signal, said gain control signal controlling the gain of said amplifier means and said output of said separator means being input to said amplifier means whereby said compensating signal corresponds to said separator means output amplitude modulated by said gain control signal;
and an adder means, connected to said amplifier means, color difference signal source and luminance signal source, for substantially adding the outputs thereof to generate an output signal for use by said color television receiver for picture reproductions.

2. A compensator as in claim 1, wherein said transfer means is arranged such that said gain control signal essentially corresponds to said color difference signal when said difference signal has a positive value and said gain control signal has essentially a zero value when said difference signal is negative.

3. A compensator as in claims 1 or 2, wherein said transfer means includes a color difference signal reducer means for reducing the value of said color difference signal when said color difference signal exceeds a specified value.

4. A compensator as in claim 1, wherein said transfer means is arranged such that said gain control signal is generated only when said color difference signal exceeds a positive specified value.

5. A compensator as in claim 1, wherein said transfer means is arranged such that said gain control signal essentially corresponds to said color difference signal when said difference signal has a value greater than a specified negative value and said gain control signal has a fixed value when said difference signal has a value less than said specified negative value.

6. A compensator as in claim 4, further comprising at least one additional non-linear transfer means having its input connected to said color difference signal source and having its output connected respectively to at least one additional controlled variable gain amplifier means, said at least one additional transfer means and at least one additional amplifier means respectively arranged to operate in essentially the same fashion as said transfer means and said amplifier means;
wherein said color difference signal source is connected to said at least one additional transfer means and said separator means is connected to said at least one additional amplifier means and an output from said at least one additional amplifier means is connected as an additional input to said adder means, said adder means further arranged to substantially add said output of said at least one additional amplifier means to said outputs of said amplifier means, color difference and luminance signal sources to generate said output signal thereof.

7. A compensator as in claims 1 or 2, wherein said separator means includes a high pass filter means for passing only a high frequency component of said luminance signal.

8. A compensator as in claims 1 or 2, wherein said separator means includes a base clip circuit means for removing signals within a specified range from a high frequency component of said luminance signal.

9. A compensator as in claims 1 or 2, wherein said separator means includes a limiter means for clipping a high frequency component of said luminance signal over a specified range.

10. A compensator as in claims 1 or 2, wherein said separator means includes a positive level clipping means for clipping a positive level component of said luminance signal.

11. A compensator as in claims 1 or 2, wherein said separator means includes a luminance level detector means connected to a signal inhibitor means, said level detector means generating a detected signal when the value of said luminance signal is greater than a specified level and said inhibitor means reducing a high frequency component of said luminance signal in response to said detected signal from said level detector means.

12. A compensator as in claims 1 or 2, wherein said separator means includes an amplitude detector means connected to a signal inhibitor means, said amplitude detector means generating a detected signal when a high frequency component of said luminance signal exceeds a specified level and said inhibitor means reducing said high frequency component of said luminance signal in response to said detected signal from said amplitude detector means.

* * * * *